United States Patent [19]

Hoshino

[11] Patent Number: 4,725,649
[45] Date of Patent: Feb. 16, 1988

[54] RUBBER COMPOSITION FOR TIRE INNER LINER

[75] Inventor: Takashi Hoshino, Tokyo, Japan

[73] Assignee: Bridgestone Corporation, Tokyo, Japan

[21] Appl. No.: 899,671

[22] Filed: Aug. 25, 1986

[30] Foreign Application Priority Data

Sep. 12, 1985 [JP] Japan .................................. 60-200588

[51] Int. Cl.$^4$ ......................... C08L 9/00; C08L 15/02; C08L 49/00
[52] U.S. Cl. .................................. 525/133; 152/510; 525/202; 525/236; 525/237
[58] Field of Search ............... 525/133, 237, 236, 202; 152/510

[56] References Cited

U.S. PATENT DOCUMENTS 3,812,216  5/1974  Sato et al. ........................... 525/133

FOREIGN PATENT DOCUMENTS

| 191299 | 11/1986 | European Pat. Off. | |
|---|---|---|---|
| 57-172945 | 10/1982 | Japan . | |
| 57-195760 | 12/1982 | Japan . | |
| 855032 | 5/1960 | United Kingdom | 525/133 |
| 870947 | 6/1961 | United Kingdom | 525/133 |

*Primary Examiner*—Allan M. Lieberman
*Attorney, Agent, or Firm*—Schwartz, Jeffery, Schwaab, Mack, Blumenthal & Evans

[57] ABSTRACT

A rubber composition for an inner liner of a vehicular tire, high in stickiness before vulcanization and in adhesive strength after vulcanization and having good low temperature characteristics so as to effectively suppress crack formation in the inner liner. The rubber composition comprises a rubber component including halogenated butyl rubber ranging from 60 to 100 parts by weight, and diene rubber not more than 40 parts by weight. Tert-butylphenolacetylene resin is blended in a range from 0.5 to 10 parts by weight with 100 parts by weight of the rubber component.

8 Claims, No Drawings

RUBBER COMPOSITION FOR TIRE INNER LINER

BACKGROUND OF THE INVENTION

1. Field of the Invention

The present invention relates generally to a rubber composition of an inner liner of a tire, and more particularly to improvements in an inner liner for a tire whose internal pressure is required to be securely maintained as particularly in radial-ply tires and bias-ply tires for passenger cars, tires for motorcycles, and tires for trucks and buses.

2. Description of the Prior Art

In connection with radial-ply and bias-ply tires for passenger cars, tires for motorcycles, and tires for trucks and buses, it is important to maintain the internal pressure of the tires. For this purpose, a rubber composition including as a main component a halogenated butylene rubber has been hitherto used as an inner liner of the tire as disclosed, for example, in Japanese Patent Provisional (First) Publication Nos. 57-172945 and 57-195760.

Such a rubber composition including as the main component halogenated butylene rubber is useful from a view point of maintaining the internal pressure of the tire. However, the rubber composition is inferior in stickiness due to the fact that its main component is halogenated butylene rubber, so that sufficiently tight contact cannot be obtained between the inner liner and a tire casing during fabrication of a green tire. This will unavoidably allow air to enter between the inner liner and the tire casing after vulcanization. Additionally, sufficient adhesive strength cannot be obtained between the inner liner and the tire casing, thereby causing peeling of the inner liner from the tire casing. Furthermore, because of insufficiently tight contact of the inner liner with the tire casing, lubricant and the like applied before vulcanization for the purpose of making tight contact with a vulcanization bladder unavoidably enters between the inner liner and the tire casing, so that sufficient adhesive strength cannot be obtained between the inner liner layer and the tire casing. This will allow cracks to be formed or extended at a location where the lubricant and the like has entered, thereby causing breakdown of the inner liner and the tire casing.

In this regard, it is usual to blend a suitable amount of a tackifier in order to increase the stickiness of the rubber composition of the inner liner. Examples of the tackifier are phenol resins, terpene resins, petroleum hydrocarbon resins and the like. However, these resins unavoidably harden at low temperatures and therefore adversely affect the low temperature characteristics of the inner liner, thereby forming cracks in the inner liner during vehicle cruising at low temperatures. Additionally, there is a tendency for the breaking strength of the rubber of the inner liner to decrease as the blending amount of these resins increases, thus forming cracks in the inner liner during vehicle cruising.

Furthermore, a resin such as brown asphalt has been hitherto blended in order to increase the adhesive strength of the inner liner with the tire casing in a tire fabrication process. However, such a resin readily displaces to the surface of the inner liner and crystallizes out there. This also lowers the stickiness of the inner liner.

BRIEF SUMMARY OF INVENTION

It is an object of the present invention to provide an improved rubber composition for a tire inner liner, which overcomes the above-discussed shortcomings of conventional rubber compositions.

Another object of the present invention is to provide an improved rubber composition for a tire inner liner, which has sufficiently high stickiness before vulcanization while having sufficiently high adhesive strength to a tire casing and good low temperature characteristics after vulcanization thereby to suppress crack formation and the like in the inner liner.

The present invention has been completed upon finding that tert-butylphenolacetylene having a specified structure exhibits high stickiness and adhesive strength, as a result of a detailed investigation of the relationships between molecule structure of various resins, including tackifiers, and the resin characteristics, including stickiness and adhesive strength to a tire casing rubber, in order to demonstrate the mechanism of the characteristics.

Thus, the rubber composition according to the present invention comprises a rubber component including halogenated butyl rubber ranging from 60 to 100 parts by weight, and not more than 40 parts by weight diene rubber. Additionally, the rubber composition further comprises tert-butylphenolacetylene ranging from 0.5 to 10 parts by weight relative to 100 parts by weight of the rubber component.

DETAILED DESCRIPTION OF THE INVENTION

According to the present invention, there is provided a rubber composition for an inner liner of a tire, the inner liner being securely disposed on the inner surface of a tire casing and covering the inner surface of the tire for the purpose of maintaining the internal pressure of the tire. The rubber composition comprises a rubber component including halogenated butyl rubber ranging from 60 to 100 parts by weight, and diene rubber not more than 40 parts by weight, and tert-butylphenolacetylene resin ranging from 0.5 to 10 parts by weight relative to 100 parts by weight of the rubber component.

Although the rubber component of the rubber composition of the tire inner liner contains halogenated butyl rubber ranging from 60 to 100 parts by weight and diene rubber not more than 40 parts by weight for the purpose of maintaining the internal pressure of the tire, tert-butylphenolacetylene resin ranging from 0.5 to 10 parts by weight is blended with the rubber component including preferably 100 parts by weight of, and more preferably not less than 80 parts by weight of, the halogenated rubber. These preferred ranges of the halogenated rubber are selected for the following reasons: The halogenated butyl rubber is inherently low in adhesive strength and stickiness between it and the rubber of the tire casing, so that the adhesive strength and the stickiness between the inner liner and the tire casing rubber decrease as the blending proportion of the halogenated butyl rubber increases for the purpose of increasing the internal pressure maintaining effect of the tire. As a result, the effect of the present invention in preventing decreases in the adhesive strength and the stickiness is particularly noteworthy in cases where the rubber component contains the above-mentioned higher proportions of the halogenated butyl rubber.

Examples of the halogenated butyl rubber are chlorobutyl rubber, bromobutyl rubber, and derivatives of the chlorobutyl rubber and bromobutyl rubber.

With respect to the blending proportion of the tert-butylphenolacetylene resin to the rubber composition for the tire inner liner, if it is less than 0.5 parts by weight, the improvement in adhesive strength between the inner liner and the tire casing rubber is insufficient, while if it exceeds 10 parts by weight, the essential characteristics of the inner liner deteriorate, such as elastic modulus before vulcanization, breaking strength and low temperature characteristics or performance. As a result, the blending proportion of tert-butylphenolacetylene resin may suitably be within a range of from 0.5 to 10 parts by weight relative to 100 parts by weight of the rubber component, and preferably within a range of from 1 to 6 parts by weight relative to the same.

In addition, the storage elastic modulus of the rubber composition of the inner liner at $-45°$ C. after vulcanization is preferably not higher than $8 \times 10^9$ dyn/cm$^2$, and more preferably not higher than $6 \times 10^9$ dyn/cm$^2$, in which 0.5 to 10 parts by weight of tert-butylphenolacetylene resin is blended. If this storage elastic modulus exceeds $8 \times 10^2$, the low temperature characteristics or performance of the inner liner decreases and therefore problems of crack formation and the like will occur in the inner liner when a vehicle cruises at low temperatures. It is to be noted that tert-butylphenolacetylene resin gives a desired stickiness to the inner liner and a desired adhesive strength to the tire casing even in a condition where the storage elastic modulus at $-45°$ C. is low. As compared with this, phenol resins, petroleum hydrocarbon resins, brown asphalt and the like which are conventionally blended to improve stickiness and adhesive strength cannot provide sufficient stickiness and adhesive strength in the same condition.

In addition to the feature of maintaining the above-mentioned storage elastic modulus, the breaking strength of the rubber composition of the inner liner at room temperature is preferably not lower than 90 Kg/cm$^2$, and more preferably not lower than 95 Kg/cm$^2$. If this breaking strength is lower than 90 Kg/cm$^2$, there is a possibility problems of formation crack and the like may arise during vehicle cruising.

It will be understood that usual compounding ingredients such as carbon black, softner, zinc flour (zinc white), stearic acid, vulcanization accelerator, vulcanizing agent and sulfur may be suitably blended with the rubber composition of the present invention, if necessary.

EXAMPLES

The present invention will be more clearly understood with reference to the following Examples and Comparative Examples.

Examples 1 to 4 and Comparative Examples 1 and 2

Four kinds of rubber compositions (Examples 1 to 4) according to the present invention and two kinds of rubber compositions (Comparative Examples 1 and 2) which are outside the scope of the present invention were prepared in blending proportions (in parts by weight) shown in the following Table. It is to be noted that the resultant rubber compositions of Examples 1 to 4 have a blending proportion of tert-butylphenolacetylene resin within the range of the present invention, a storage elastic modulus at $-45°$ C., within the above-mentioned preferable range, and a breaking strength within the above-mentioned preferable range. On the contrary, the rubber compositions of Comparative Examples 1 and 2 contain conventional resin compounds in place of the tert-butylphenolacetylene resin in the Examples.

EXPERIMENTS

Storage Elastic Modulus

The storage elastic modulus was measured as follows: An elongate rectangular sheet of each rubber composition after vulcanization was prepared as a specimen. The storage elastic modulus of the specimen was measured by using a spectrometer made by Iwamoto Seisakusho Co., Ltd. (in Japan) at a frequency of 50 Hz and a periodic extension distortion of 0.1%. The measurement of this storage elastic modulus is according to JIS (Japanese Industrial Standard) K6394.

Breaking strength

The breaking strength of each rubber composition (at room temperature) after vulcanization was measured according to JIS (Japanese Industrial Standard) K6301.

Next, with respect to the respective rubber compositions shown in the Table, stickiness and adhesive strength to the tire casing were measured, and inspection was made as to whether cracks were formed during low temperature vehicle cruising and during normal vehicle cruising.

Stickiness

Stress required for separation of a specimen of each rubber component (after application for 30 seconds under a load of 500 g) was measured by a Picma Tack Tester made by Toyo Seiki Seisaku-sho, Ltd. (in Japan).

Adhesive Strength to Tire Casing

The adhesive strength between the inner liner (of each rubber component) and the tire casing was measured using a specimen cut out from a tire, which specimen included a section of the inner liner and of the tire casing which were bonded to each other.

Crack Formation during Vehicle Cruising at Low Temperatures

Each rubber composition shown in the Table was applied as an inner liner to a tire having a tire size P195/75R14 (according to TRA). A field test was conducted in a cold district in Canada, in which an automotive vehicle provided with the tire was driven about 10,000 Km. Thereafter, inspection was made as to whether cracks were formed or not.

Crack Formation during Normal Vehicle Cruising

Each rubber composition shown in the Table was applied as an inner liner to a tire having a tire size 165SR13 (according to JATMA and ETRTO). A field test was conducted in an area of Yokohama City, Japan, in which a taxicab provided with the tire was driven 40,000 Km. Thereafter, inspection was made as to whether cracks were formed or not.

The experimental results of the above-mentioned tests are shown in the following Table.

TABLE

|  | Examples | | | | Comparative Examples | |
| --- | --- | --- | --- | --- | --- | --- |
|  | 1 | 2 | 3 | 4 | 1 | 2 |
| Bromobutyl rubber/natural rubber | 100/0 | 100/0 | 100/0 | 80/20 | 100/0 | 100/0 |
| Carbon black GPF (N660) | 55 | 55 | 60 | 55 | 55 | 60 |
| Softener | 7 | 7 | 7 | 7 | 7 | 7 |
| tert-butylphenolacetylene | 0.7 | 2.5 | 6 | 2 | — | — |
| Escorez 1102B* | — | — | — | — | 3 | 5 |
| Brown asphalt | — | — | — | — | 5 | 5 |
| Stearic acid | 1.5 | 1.5 | 1.5 | 1.5 | 1.5 | 1.5 |
| Dibenzothiazyldisulfide | 2 | 2 | 2 | 2 | 2 | 2 |
| Zinc flour | 4 | 4 | 4 | 4 | 4 | 4 |
| Tetramethylthiuramdisulfide | 0.2 | 0.2 | 0.2 | 0.2 | 0.2 | 0.2 |
| Sulfur | 1 | 1 | 1 | 1 | 1 | 1 |
| Storage elastic modulus at $-45°$ C. ($\times 10^9$ dyn/cm$^2$) | 6.3 | 6.6 | 7.8 | 5.7 | 8.3 | 8.9 |
| Breaking strength at room temperature (Kg/cm$^2$) | 106 | 103 | 95 | 105 | 99 | 95 |
| Stickiness (g) | 465 | 654 | 823 | 724 | 483 | 645 |
| Adhesive strength to tire casing (Kg/25 mm) | 4.5 | 6.5 | 9.0 | 7.8 | 5.5 | 4.8 |
| Crack formation during vehicle cruising at low temperatures | None | None | None | None | Slight | Formed at three locations of shoulder section |
| Crack formation during normal vehicle cruising | None | None | None | None | Formed at two locations of shoulder section | Formed at one location of central section |

*trade name, a tackifier made by Exxon Chemicals.

The experimental results in the Table demonstrate that crack formation was observed in all the rubber compositions of the Comparative Examples, while no crack formation was observed in any of the rubber compositions according to the present invention. Additionally, improvements in stickiness and adhesive strength to the tire casing due to the action of tert-butylphenolacetylene resin are apparently indicated.

As appreciated from the above discussion, according to the present invention, a specified amount of tert-butylphenolacetylene is blended into the rubber composition for the tire inner liner, thereby exhibiting sufficiently high stickiness before vulcanization while exhibiting sufficiently high adhesive strength and good low temperature characteristics to suppress crack formation and the like after vulcanization.

What is claimed is:

1. A rubber composition for an inner liner of a tire, comprising:
    a rubber component including halogenated butyl rubber ranging from 60 to 100 parts by weight, and diene rubber not more than 40 parts by weight; and
    tert-butylphenolacetylene resin ranging from 0.5 to 10 parts by weight relative to 100 parts by weight of said rubber component,
    wherein said rubber composition has a storage elastic modulus at $-45°$ C. after vulcanization, not higher than $8 \times 10^9$ dyn/cm$^2$.

2. A rubber composition as claimed in claim 1, wherein said rubber component includes halogenated butyl rubber ranging from 80 to 100 parts by weight.

3. A rubber composition as claimed in claim 1, wherein said halogenated butyl rubber is one selected from the group consisting of chlorobutyl rubber, bromobutyl rubber, and derivatives of chlorobutyl rubber and bromobutyl rubber.

4. A rubber composition as claimed in claim 1, wherein said tert-butylphenolacetylene resin ranges from 1 to 6 parts by weight relative to 100 parts by weight of said rubber component.

5. A rubber composition as claimed in claim 1, wherein said rubber composition has a storage elastic modulus at $-45°$ C. after vulcanization, not higher than $6 \times 10^9$ dyn/cm$^2$.

6. A rubber composition as claimed in claim 1, further comprising at least one selected from the group consisting of carbon black, softener, zinc flour, stearic acid, vulcanization accelerator, vulcanizing agent, and sulfur.

7. A rubber composition for an inner liner of a tire, comprising:
    a rubber component including halogenated butyl rubber ranging from 60 to 100 parts by weight, and diene rubber not more than 40 parts by weight; and
    tert-butylphenolacetylene resin ranging from 0.5 to 10 parts by weight relative to 100 parts by weight of said rubber component,
    wherein said rubber composition has a breaking strength at room temperature, not lower than 90 kg/cm$^2$.

8. A rubber composition as claimed in claim 7, wherein said rubber composition has a breaking strength at room temperature, not lower than 95 Kg/cm$^2$.

* * * * *